US012612969B1

(12) United States Patent
    Beathard

(10) Patent No.:     US 12,612,969 B1
(45) **Date of Patent:        \*Apr. 28, 2026**

(54) WHEEL SEAL

(71) Applicant: Brian Beathard, Franklin, TN (US)

(72) Inventor: Brian Beathard, Franklin, TN (US)

( \* ) Notice:    Subject to any disclaimer, the term of this patent is extended or adjusted under 35 U.S.C. 154(b) by 0 days.

This patent is subject to a terminal disclaimer.

(21) Appl. No.: 19/029,470

(22) Filed:    Jan. 17, 2025

Related U.S. Application Data

(63) Continuation of application No. 17/567,839, filed on Jan. 3, 2022, now Pat. No. 12,203,551.

(60) Provisional application No. 63/132,972, filed on Dec. 31, 2020.

(51) Int. Cl.
    *F16J 15/32*       (2016.01)
    *F16J 15/3208*     (2016.01)
    *F16J 15/3236*     (2016.01)
    *F16J 15/3256*     (2016.01)
    *F16J 15/3276*     (2016.01)

(52) U.S. Cl.
    CPC ....... *F16J 15/3256* (2013.01); *F16J 15/3208* (2013.01); *F16J 15/3236* (2013.01); *F16J 15/3276* (2013.01)

(58) Field of Classification Search
    CPC .. F16J 15/3284; F16J 15/3256; F16J 15/3208; F16J 15/3236; F16J 15/3276; F16J 15/3264; F16J 15/3456
    See application file for complete search history.

(56) References Cited

U.S. PATENT DOCUMENTS

| | | | | |
|---|---|---|---|---|
| 4,981,303 A * | 1/1991 | Matsushima | ........ | F16J 15/3264 277/351 |
| 5,015,001 A * | 5/1991 | Jay | ........ | F16J 15/3256 277/933 |
| 5,096,207 A * | 3/1992 | Seeh | ........ | F16J 15/3256 277/575 |
| 5,269,536 A * | 12/1993 | Matsushima | ........ | F16J 15/3256 277/573 |
| 5,509,667 A * | 4/1996 | Klein | ........ | F16C 27/066 277/565 |
| 7,594,664 B2 * | 9/2009 | Maskaliunas | ........ | F16J 15/3456 277/572 |
| 7,658,386 B2 * | 2/2010 | Oldenburg | ........ | F16J 15/3256 277/572 |
| 8,141,882 B2 * | 3/2012 | Wang | ........ | F16J 15/3264 277/353 |
| 8,439,363 B2 * | 5/2013 | Greca | ........ | F16J 15/3456 277/572 |
| 8,534,674 B2 * | 9/2013 | Maskaliunas | ........ | F16J 15/3208 277/551 |
| 8,734,022 B2 * | 5/2014 | Dittmar | ........ | F16J 15/3276 384/480 |
| 9,163,730 B2 * | 10/2015 | Maskaliunas | ........ | F16J 15/3208 |
| 9,845,883 B2 * | 12/2017 | Larson | ........ | F16J 15/3252 |
| 10,190,691 B2 * | 1/2019 | Tanida | ........ | F16J 15/3216 |
| 10,208,801 B1 * | 2/2019 | Wang | ........ | F16C 33/7886 |
| 10,240,677 B2 * | 3/2019 | Angiulli | ........ | F16J 15/3268 |
| 12,005,734 B2 * | 6/2024 | Regan | ........ | F16C 43/04 |

(Continued)

*Primary Examiner* — Christine M Mills
*Assistant Examiner* — L. Susmitha Koneru
(74) *Attorney, Agent, or Firm* — Shane Cortesi

(57)               ABSTRACT
A wheel seal is described. The wheel seal may include an annular wheel seal body comprising a top plate and a bottom plate, an annular spring located within the body, and a connecting elastomer.

17 Claims, 13 Drawing Sheets

(56)           References Cited

U.S. PATENT DOCUMENTS

| | | | |
|---|---|---|---|
| 2002/0011710 A1* | 1/2002 | Oldenburg | F16J 15/3256 |
| | | | 277/612 |
| 2004/0169338 A1* | 9/2004 | Hintenlang | F16J 15/3268 |
| | | | 277/549 |
| 2007/0205562 A1* | 9/2007 | Chien | F16J 15/3244 |
| | | | 277/551 |
| 2008/0054572 A1* | 3/2008 | Maskaliunas | F16J 15/3456 |
| | | | 277/551 |
| 2009/0127791 A1* | 5/2009 | Buro | F16J 15/3244 |
| | | | 277/352 |
| 2011/0262063 A1* | 10/2011 | Dittmar | F16J 15/3276 |
| | | | 384/147 |
| 2012/0068416 A1* | 3/2012 | Greca | F16J 15/3456 |
| | | | 277/353 |
| 2012/0313328 A1* | 12/2012 | Larson | F16J 15/3276 |
| | | | 277/549 |
| 2016/0010750 A1* | 1/2016 | Colineau | F16J 15/3232 |
| | | | 277/575 |
| 2020/0103029 A1* | 4/2020 | Hintenlang | F16J 15/3228 |
| 2021/0129582 A1* | 5/2021 | Regan | F16C 33/7896 |

* cited by examiner

WHEEL SEAL

TECHNICAL FIELD

The present invention relates to wheel seals designed to keep dirt and debris away from the bearings of a heavy-duty vehicle and to prevent lubricant from leaking out of the wheel.

BACKGROUND OF THE INVENTION

In the automotive industry, there is a desire to keep the bearings of a vehicle clean and free of dirt and debris that may build up around the wheel during normal use. Further, there is also a desire to keep the lubricant in the wheel from leaking out and requiring an operator to add more lubricant. Current wheel seals require special tools to install and are easily damaged if not installed properly, which can cause premature failure. Further, current wheel seals are inflexible and may fail when the vehicle is driven on uneven terrain.

Applicant (REVHD LLC, Franklin, Tennessee) currently sells a wheel seal under the name REVHD that includes a top plate and a bottom plate that is vertically moveable relative to the top plate. However, the vertical movement of the existing seal design is not smooth. In addition, the top plate can be become worn and fail over time, especially if installed with a hammer.

Thus, there is a continuing need for easy-to-install, robust wheel seals.

SUMMARY OF THE INVENTION

The present disclosure relates to wheel seals as described herein.

BRIEF DESCRIPTION OF THE DRAWINGS

in FIG. 3, the wheel seal is in an untilted configuration.

DETAILED DESCRIPTION

Figure 1:
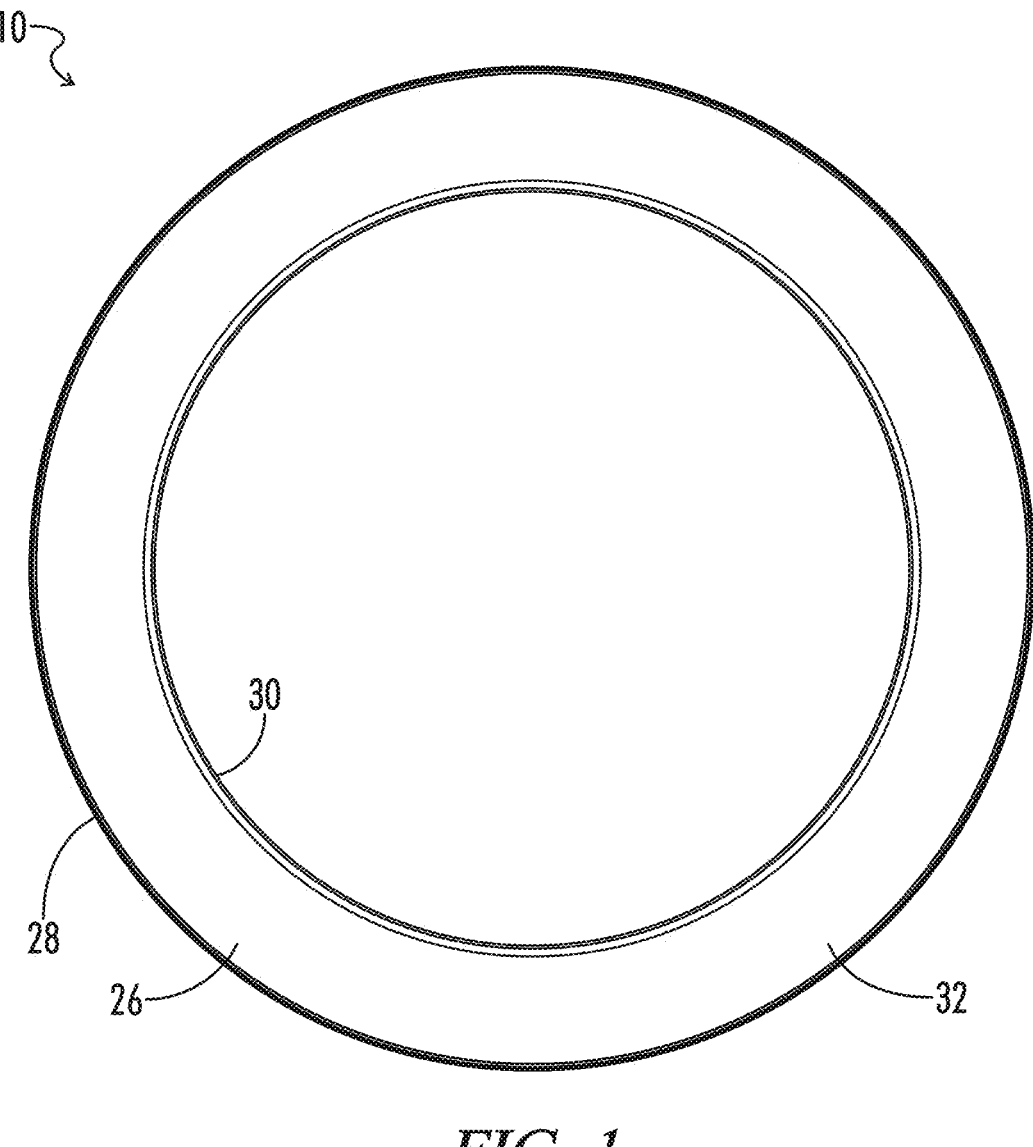
FIG. 1 shows a top plan view of a wheel seal of one embodiment of the present invention with the top plate visible.
Figure 2:
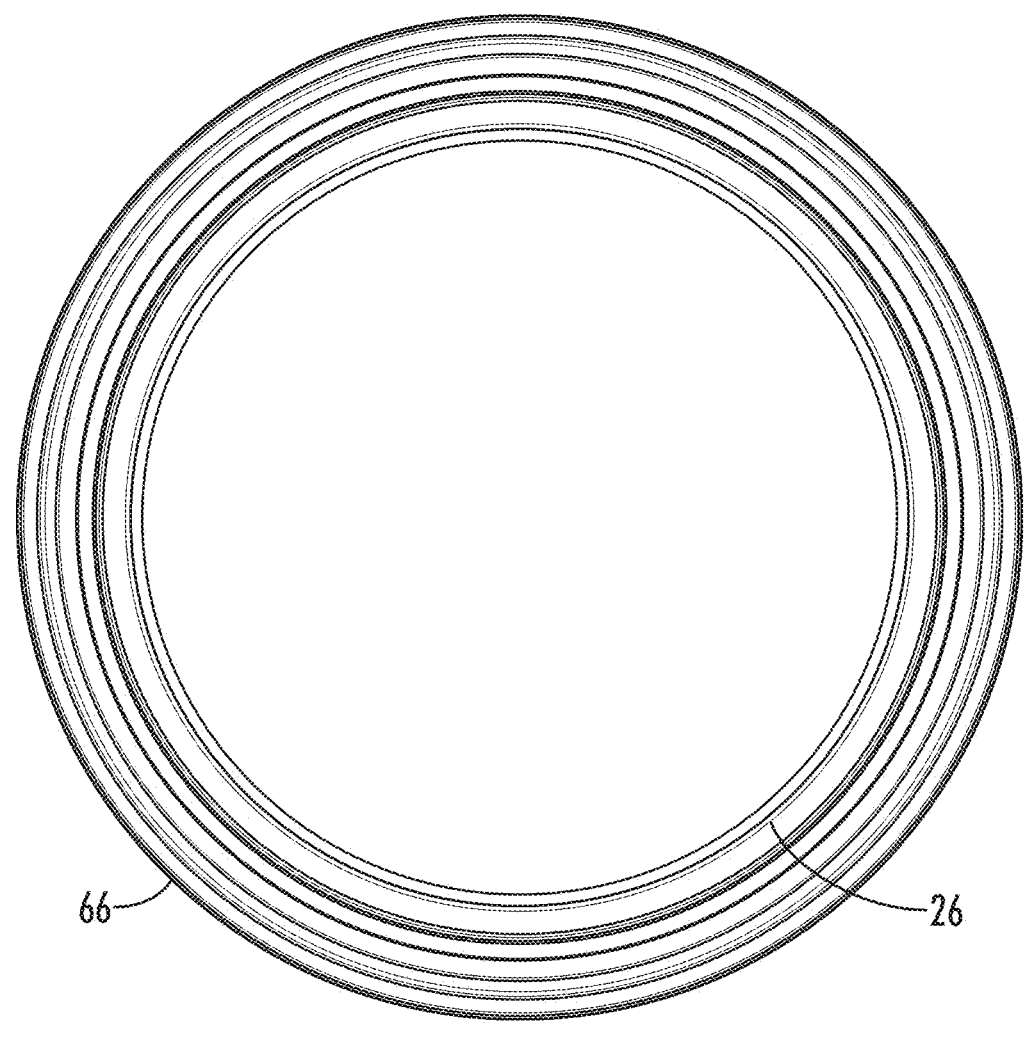
FIG. 2 shows a bottom plan view of the wheel seal of FIG. 1 with the bottom plate, top plate interior, and top plate inner ring visible.
Figure 3A:
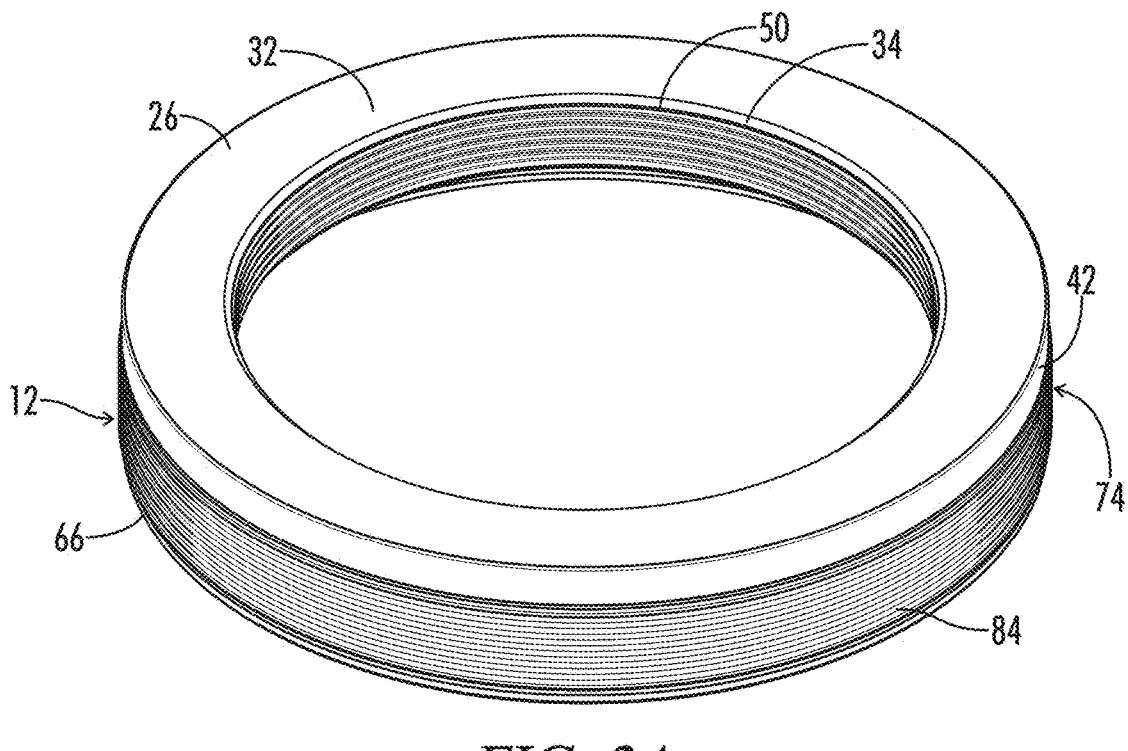
FIG. 3A show a top, side perspective view of the wheel seal of FIG. 1 with the top plate in a lowered/relaxed position.
Figure 3B:
FIG. 3B show a side elevation view of the wheel seal of FIG. 1.
Figure 3C:
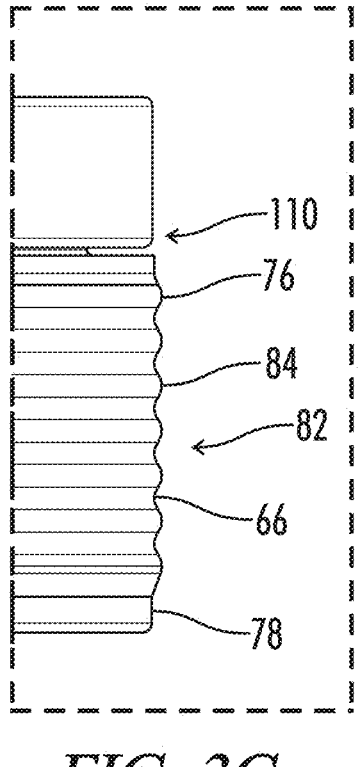
FIG. 3C show a side elevation view of the boxed area labelled 3C in FIG. 3B.
Figure 4:
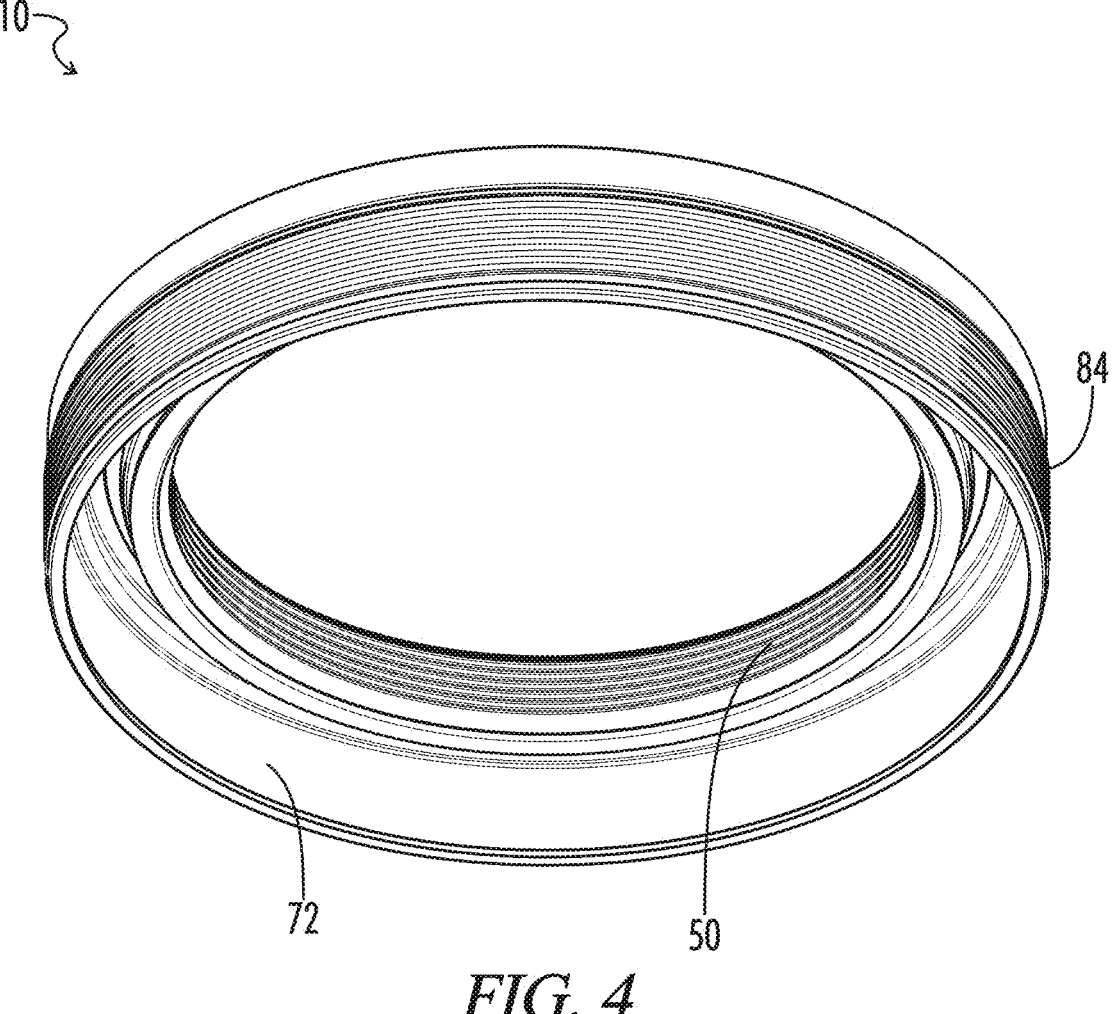
FIG. 4 shows a bottom, side perspective view of the wheel seal of FIG. 1.
Figure 5A:
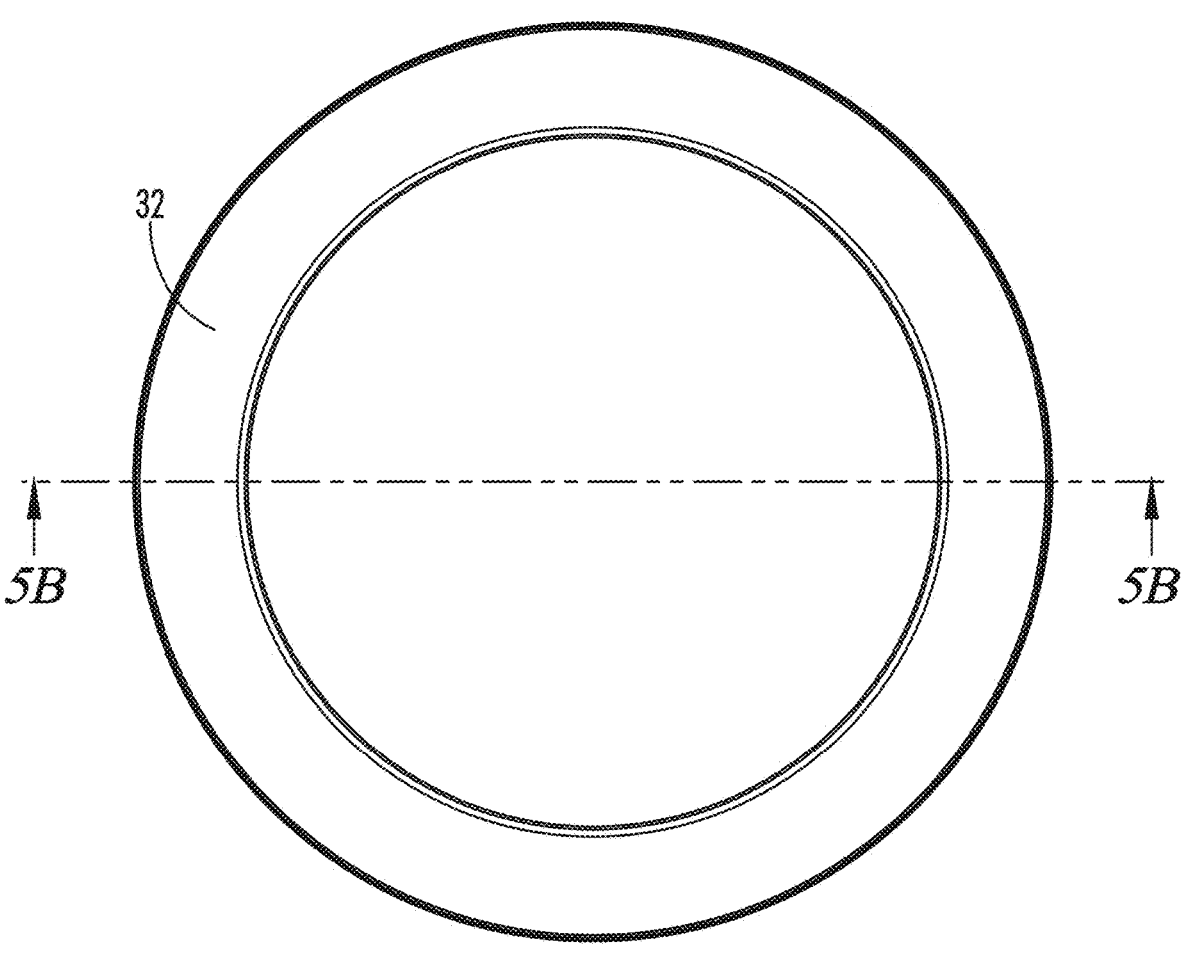
FIG. 5A shows top a plan view of the wheel seal of FIG. 1.
Figure 5B:
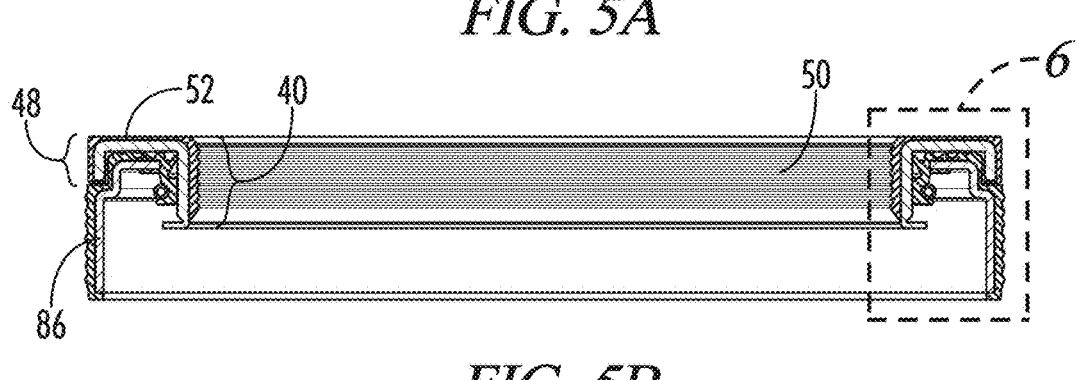
FIG. 5B shows a side cross-sectional view of the wheel seal of FIG. 5A taken along line 5B-5B of FIG. 5A.

With reference to FIGS. 1-13, the present invention provides a wheel seal 10. In the drawings, not all reference numbers are included in each drawing for the sake of clarity.

Referring further to FIGS. 1-13, the wheel seal 10 includes an annular wheel seal body 12 comprising a body inner ring wall 14, a body outer ring wall 16, a body top 18, a body bottom 20, a body height 22 extending from the body top 18 to the body bottom 20, and a body interior 24 located between the body inner ring wall 14 and the body outer ring wall 16.

The annular wheel seal body 12 may also include a top plate 26 comprising a top wall 32 forming the body top 18, a top plate inner ring wall 34 forming at least a portion of the body inner ring wall 14 and a top plate outer ring wall 42 forming an upper portion of the body outer ring wall 16, top plate outer ring wall 42 comprising a top 44, a bottom 46 and a height 48 extending from the top 44 to the bottom 46, the top plate inner ring wall 34 comprising a top 36, a bottom 38, a height 40 extending from the top 36 to the bottom 38, and a plurality of top plate ribs 50 extending circumferentially around the top plate inner ring wall 34 and spaced about the top plate inner ring wall height 40, the top plate 26 comprised of a top plate metal core 52 lined on a plurality of sides by a top plate outer elastomer 62, wherein the top plate outer elastomer 62 forms at least a portion of the top plate top wall 32, the top plate inner ring wall 34 and the top plate outer ring wall 42.

The top plate top wall 32 may be flat or substantially flat from the top plate inner wall 34 to the top plate outer wall 42. The top plate outer ring wall 42 may be generally flat and straight along the top plate outer ring wall height 48 and the top plate height. The top plate 26 may also include an outer diameter 28 and inner diameter 30. The top plate outer diameter 28 may be substantially constant along the top plate height.

The top plate metal core 52 may also include a bottom annular lip 54, an inner vertical annular segment 56 extending upward from the bottom annular lip 54 generally parallel to the top plate inner ring wall height 40, a horizontal annular segment 58 extending from a top of the inner vertical annular segment 56 generally perpendicular to the top plate inner ring wall height 40, and an outer vertical annular segment 60 extending from a top of the horizontal annular segment 58 downward generally parallel to the top plate outer ring wall height 48. Substantially all of the top plate metal core 52 may be located in the body interior 24.

Figure 6:
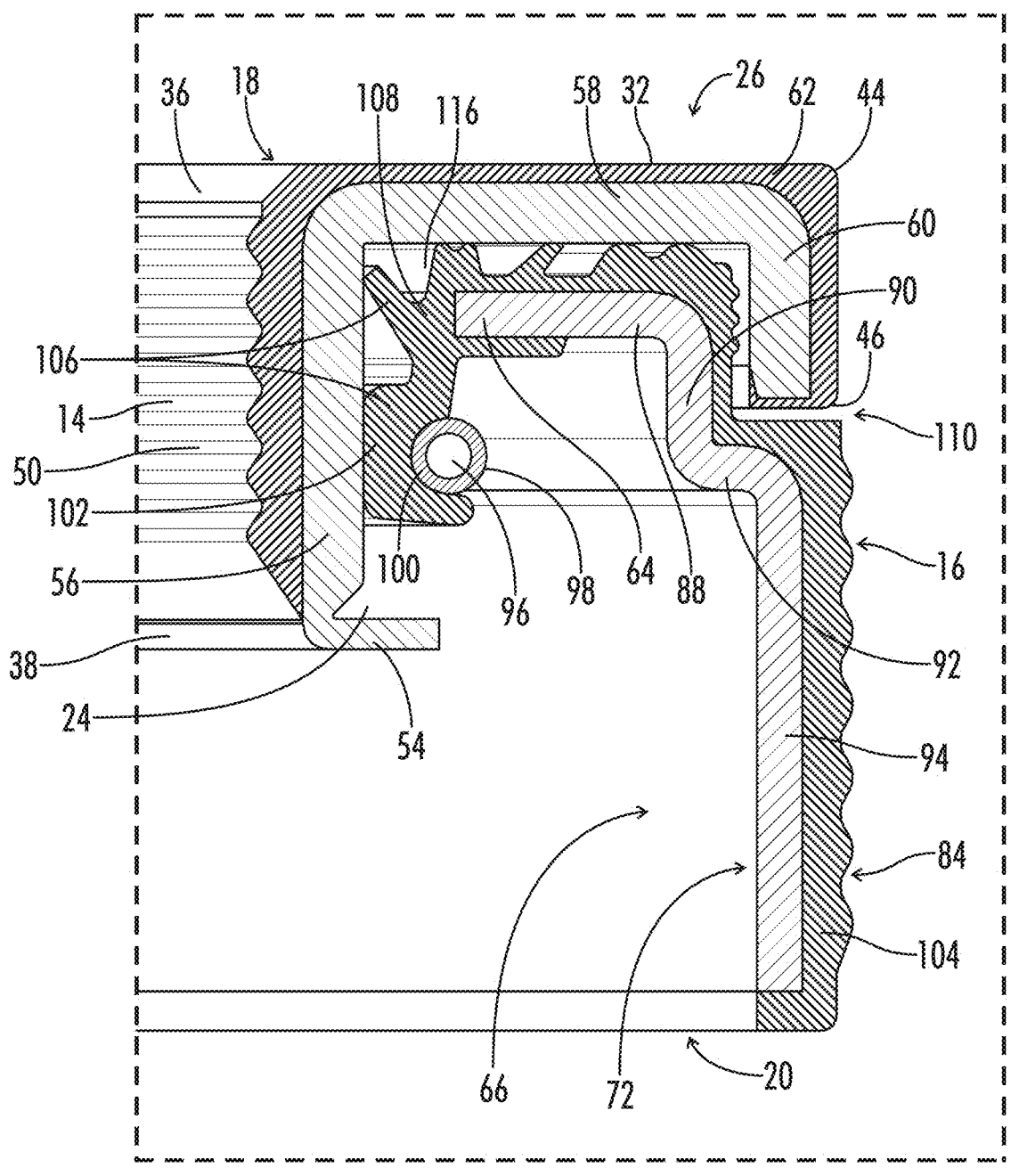
FIG. 6 shows a side view of the boxed area labelled 6 in FIG. 5B.
Figure 7A:
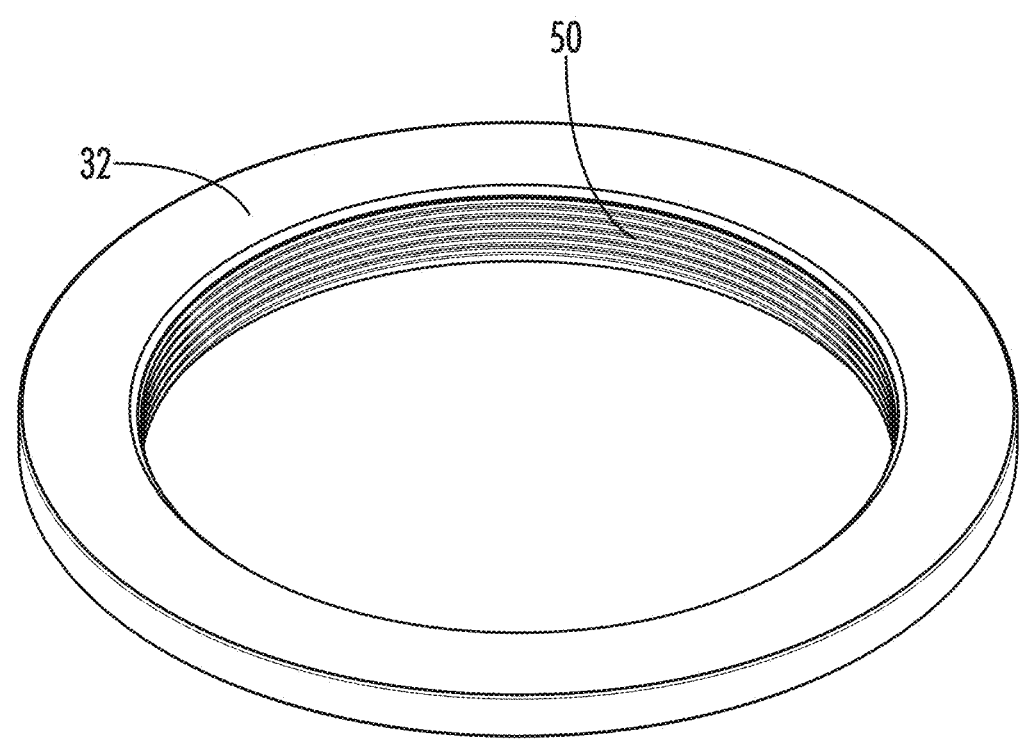
FIG. 7A shows a top, side perspective view of the top plate of the wheel seal of FIG. 1.
Figure 7B:
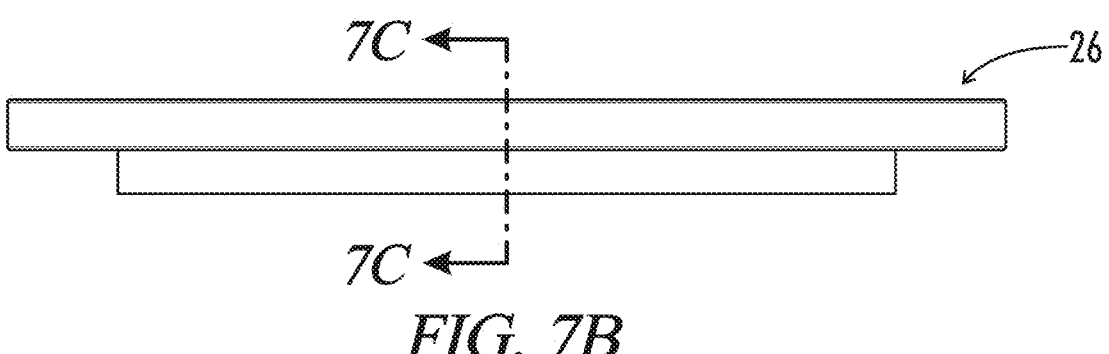
FIG. 7B shows a side elevation view of the top plate of FIG. 7A.
Figure 7C:
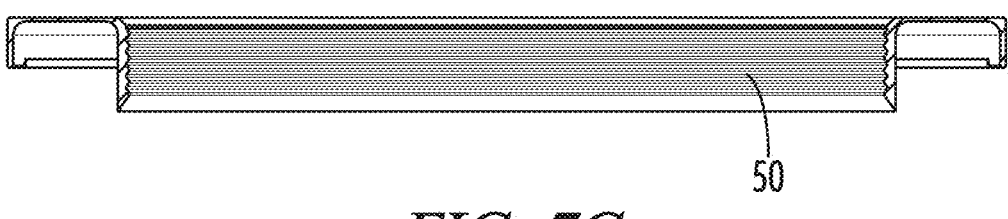
FIG. 7C shows a side cross-sectional view of the top plate of FIG. 7B taken along line 7C-7C of FIG. 7B.
Figure 8A:
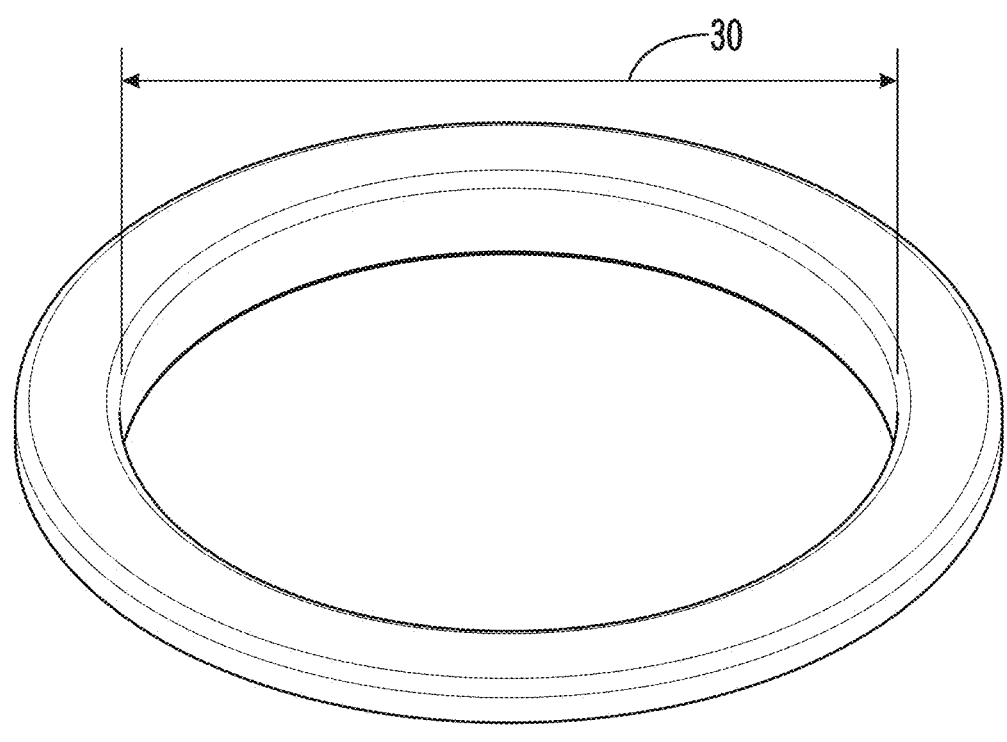
FIG. 8A shows a top, side perspective view of the top plate and top plate core of the wheel seal of FIG. 1.
Figure 8B:
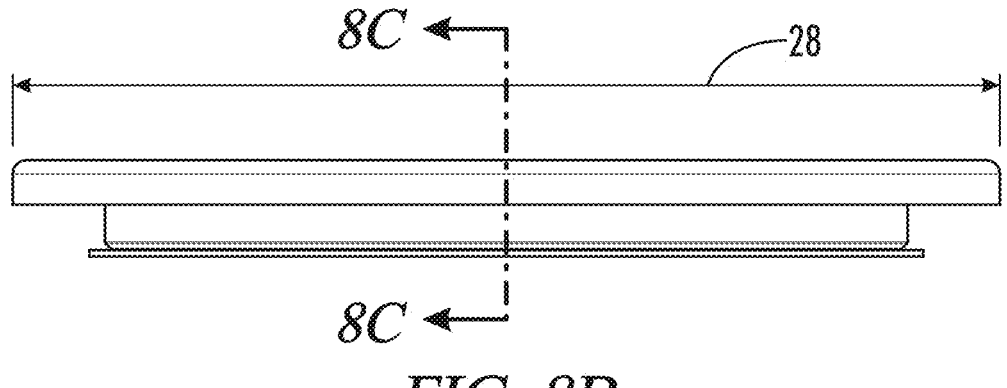
FIG. 8B shows a side elevation view of the top plate and top plate core of FIG. 8A.
Figure 8C:
FIG. 8C shows a side cross-sectional view of the top plate and top plate core of FIG. 8B taken along line 8C-8C of FIG. 8B.
Figure 9A:
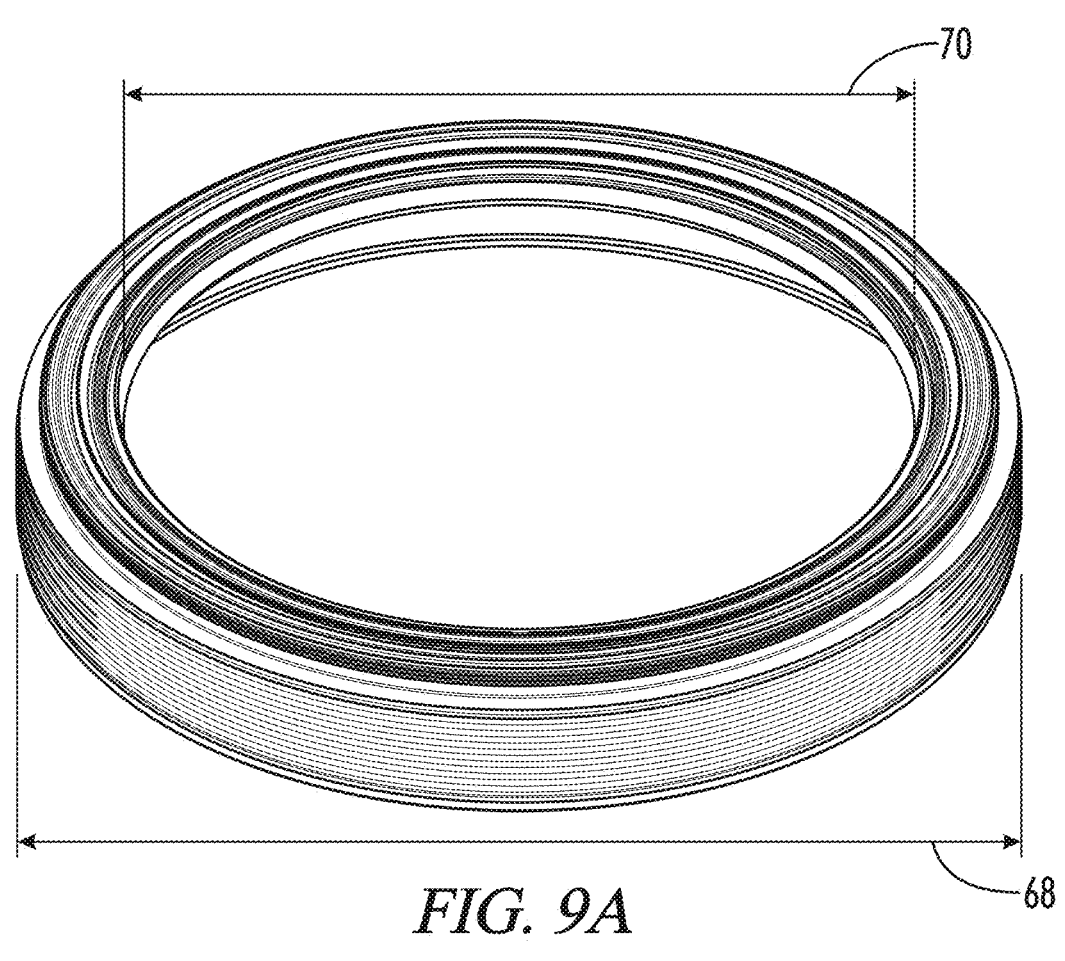
FIG. 9A shows a top, side perspective view of the bottom plate of the wheel seal of FIG. 1.
Figure 9B:
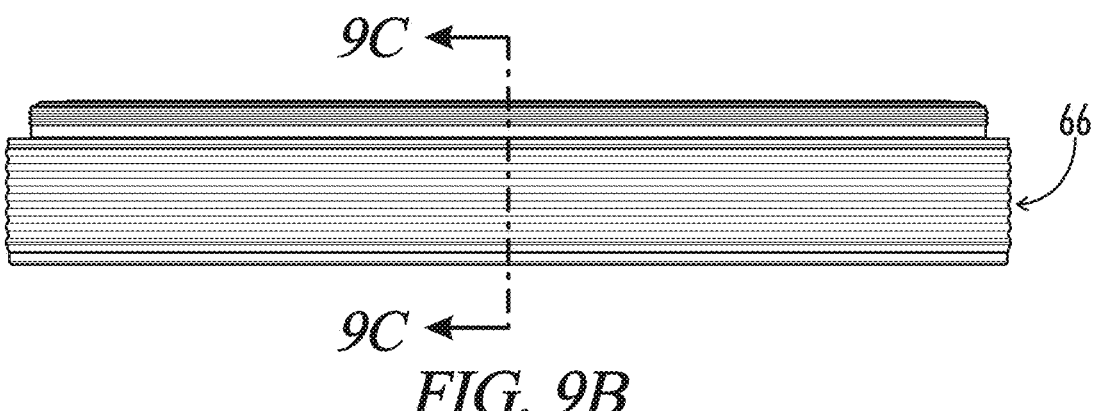
FIG. 9B shows a side elevation view of the bottom plate of FIG. 9A.
Figure 9C:
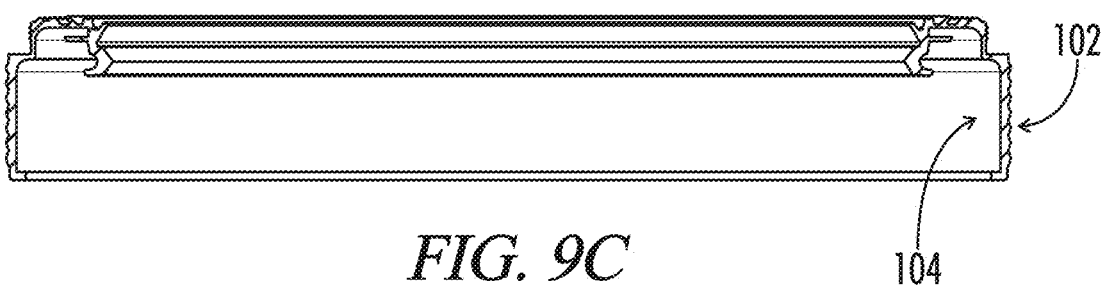
FIG. 9C shows a side cross-sectional view of the bottom plate of FIG. 9B taken along line 9C-9C of FIG. 9B.
Figure 10A:
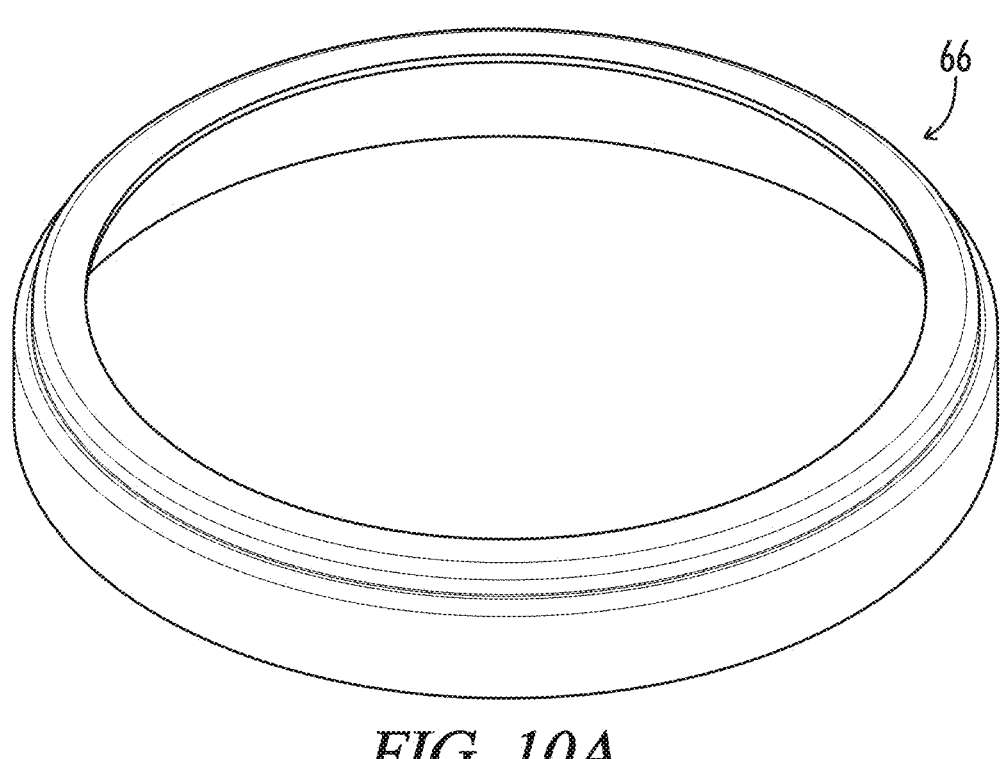
FIG. 10A shows a bottom, side perspective view of the bottom plate and bottom plate core of the wheel seal of FIG. 1.
Figure 10B:
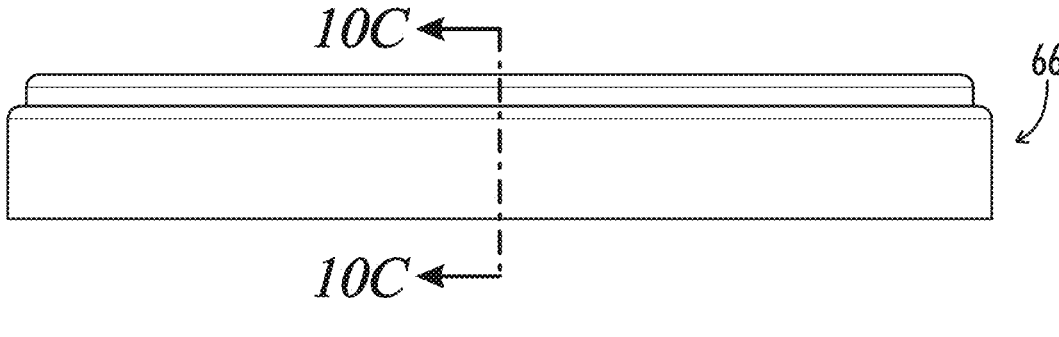
FIG. 10B shows a side elevation view of the bottom plate and bottom plate core of FIG. 10A.
Figure 10C:
FIG. 10C shows a side cross-sectional view of the bottom plate and bottom plate core of FIG. 10B taken along line 10C-10C of FIG. 10B.
Figure 11:
FIG. 11 shows a rear elevation view of exemplary wheel seal packaging for use with the wheel seal of FIG. 1.
Figure 11:
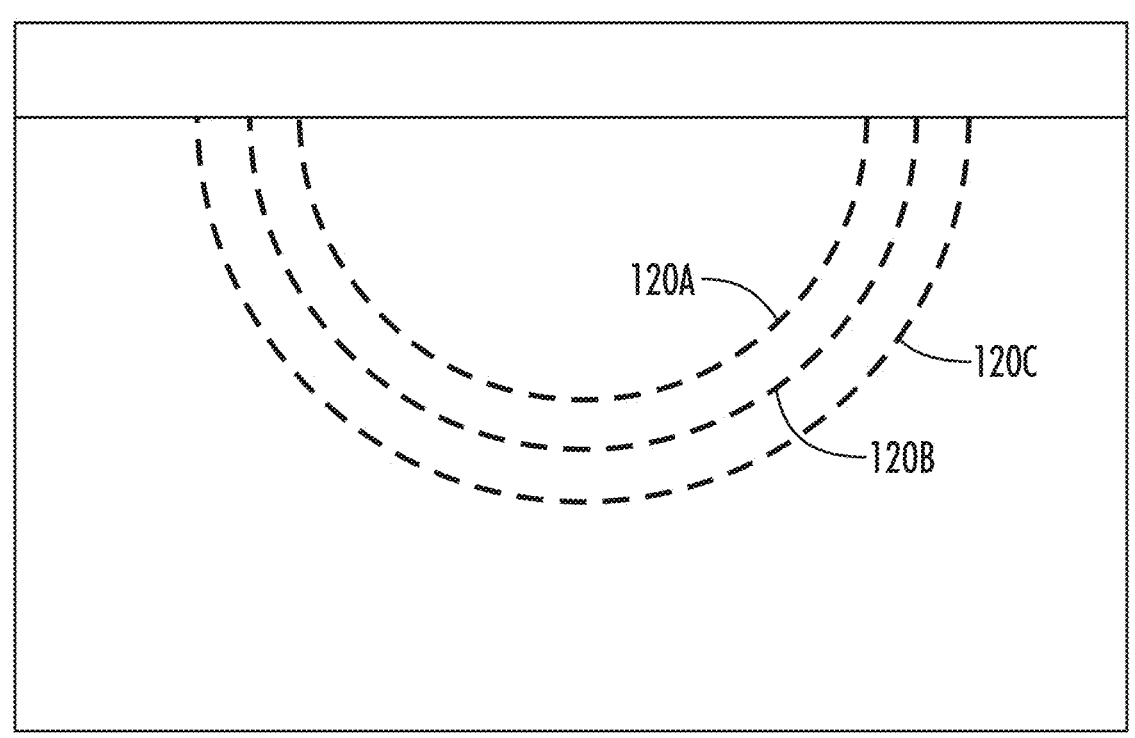
Figure 12:
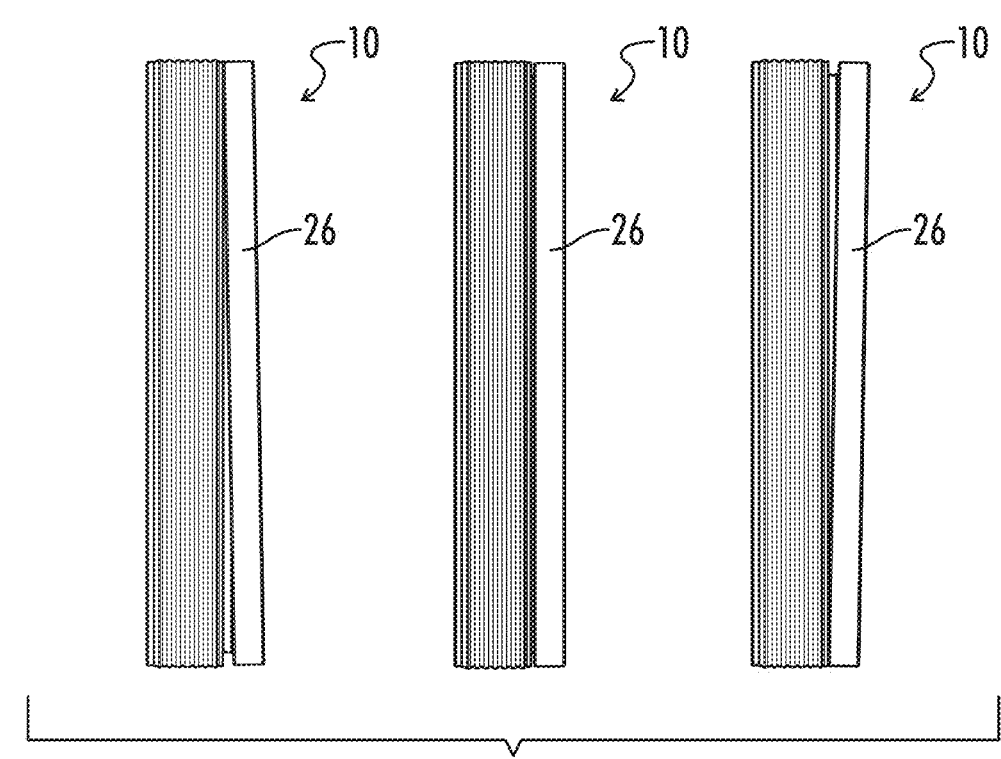
FIG. 12 shows side elevation views of three wheel seals, with the left and right wheel seals in the tilted configuration and the middle wheel seal in the untilted configuration.
Figure 13:
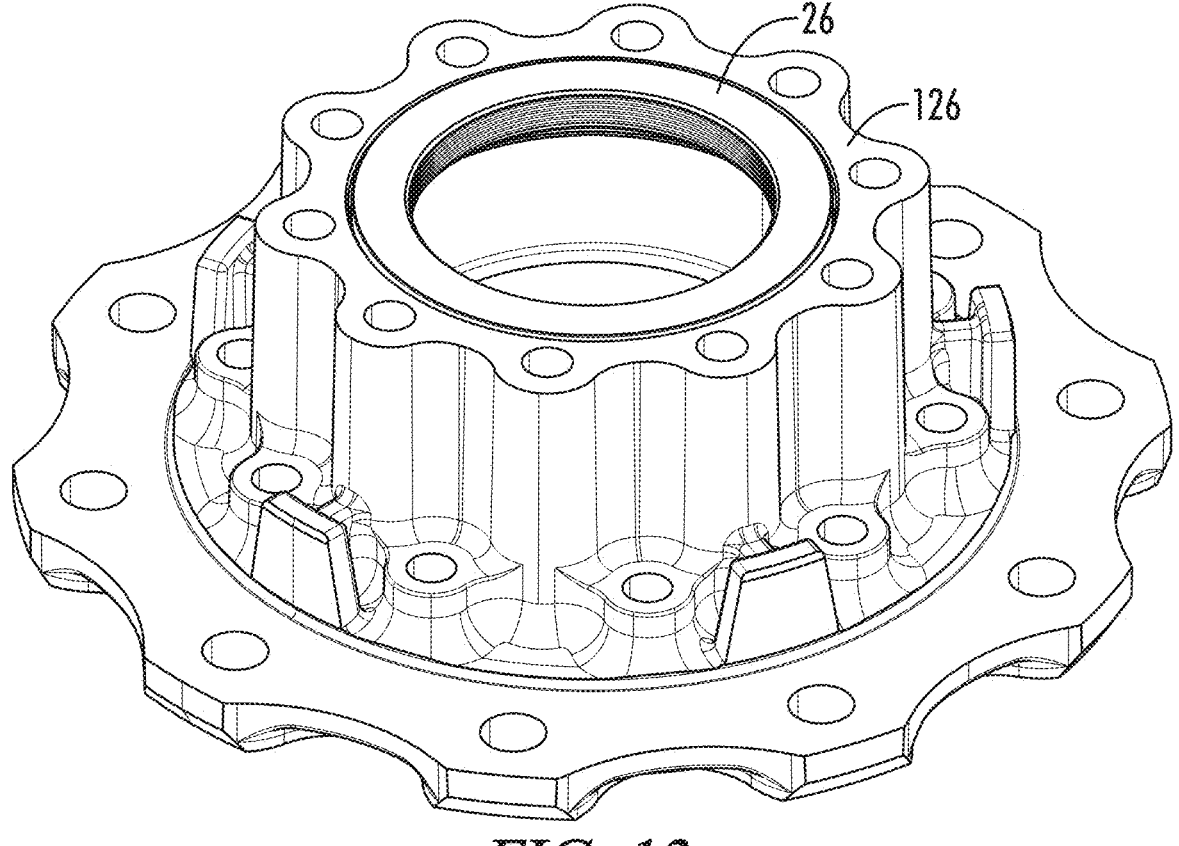
FIG. 13 shows a side perspective view of the wheel seal of FIG. 1 installed on a hub.

The top plate outer elastomer 62 may form substantially all or all of the top plate top wall 32, the top plate inner wall 34 and the top plate outer wall 42. In other words, the top plate outer elastomer 62 lines the core 52 in a substantially continuous and complete manner as depicted in FIG. 6. Optionally, the top plate outer elastomer 62 may be comprised of HNBR. Additionally, the top plate outer elastomer 62 may be in the form of a single, integrated piece of elastomer that extends continuously from the top plate ring inner wall, along the top plate top wall 32, to the top plate outer ring wall 42.

The annular wheel seal body 12 may also include a bottom plate 66 located below the top plate top wall 32, the bottom plate 66 comprising a bottom plate inner ring wall 72 and a bottom plate outer ring wall 74, the bottom plate outer ring wall 74 located below the top plate outer ring wall 42 and forming a lower portion of the body outer ring wall 82, the bottom plate outer ring wall 74 comprising a top 76, a bottom 78, a height 80 extending from the top 76 to the bottom 78 and generally parallel to the top plate outer wall height 48, and a plurality of bottom plate ribs 84 extending circumferentially around the bottom plate outer ring wall 74 and spaced about the bottom plate outer wall height 80, the bottom plate 66 comprised of a bottom plate metal core 86.

The bottom plate 66 may also include an outer diameter 68 and inner diameter 70. In the exemplary embodiment the top plate outer ring wall 42 is not indented and is substantially aligned with the bottom plate outer ring wall 74. In other words, the top plate outer diameter 28 and bottom plate outer diameter 68 are substantially equal. The bottom plate 66 may be fitted to the top plate 26 in such a way that they are not easily separated.

The top 76 of the bottom plate outer ring wall 74 may be separated from the bottom 46 of the top plate outer ring wall 42 by a gap 110 having an adjustable height extending generally parallel to the top plate outer ring wall 42 and the bottom plate outer ring wall 74. The gap 110 may extend circumferentially around the body outer ring wall 16. The bottom 46 of the top plate outer ring wall 42 is configured to move vertically relative to the top plate outer ring wall 42 between a lowered/relaxed position and a raised/extended position so as to change the height of the gap 110 (and the body height 22). For example, to install the wheel seal 10, a user may hit the top plate 26 with a hammer to move the top plate 26 toward the bottom plate 66. The top plate 26 may be configured to tilt relative to the bottom plate 66. There may be an untilted configuration in which the gap 110 is the same height about the body outer ring wall 16 circumference and a titled configuration in which the gap 110 is not the same height along the body outer ring wall 16 circumference.

The bottom plate metal core 86 may include a generally rectangular free inner edge 64, a top horizontal annular segment 88 extending generally perpendicular to the top plate outer ring wall height 48, an indented vertical annular segment 90 extending downward from the top horizontal annular segment 88 generally parallel to the top plate outer ring wall height 48, a lower horizontal annular segment 92 located below the top horizontal annular segment 88 and extending from the indented vertical segment 90 toward the bottom plate outer ring wall 74 generally perpendicular to the bottom plate outer ring wall height 80, and an outer vertical annular segment 94 located below the indented vertical annular segment 90 and extending downward from the lower horizontal annular segment 92 generally parallel to the bottom plate outer ring wall height 80. Substantially all of the bottom plate metal core 86 may be located in the body interior 24.

The wheel seal 10 may also include an annular spring 96 located in the body interior 24. The annular spring 96 may be located between the top plate inner ring wall 34 and the bottom plate outer ring wall 74. The annular spring 96 may include an outer diameter 98 and inner diameter 100. The top plate and bottom plate outer diameters 28 and 68 may be greater than the outer and inner diameters of the annular spring 98 and 100. The annular spring outer and inner diameters 98 and 100 may be greater than the inner diameter 30 of the top plate 26 and less than the inner diameter 70 of the bottom plate 66.

The wheel seal 10 may also include a connecting elastomer 102 located in the body interior 24 and extending at least partially around the spring 96, the connecting elastomer 102 comprising a plurality of projections 106 engaging the top plate metal core 52, the connecting elastomer 102 extending at least partially around the bottom plate metal core 86 and forming at least a portion of the bottom plate outer ring wall 74. The connecting elastomer 102 may also include a generally flat and continuous surface 104 engaging the bottom plate metal core 86. The connecting elastomer 102 may also include a generally rectangular recess 108 to receive the generally rectangular free inner edge 64 of the bottom plate metal core 86. The connecting elastomer 102 may also form at least a portion of the bottom plate outer ring wall 74 and extend all or substantially all of the bottom plate outer wall height 80. Optionally, the connecting elastomer 102 may be comprised of NBR or HNBR. Additionally, the connecting elastomer 102 may be in the form of a single, integrated piece of elastomer that extends continuously from the spring 96, along the bottom plate core 86, to the bottom plate outer ring wall 74.

The bottom annular lip 54 of the top plate metal core 52 may extend from the top plate inner ring wall 34 toward the bottom plate inner ring wall 72 generally perpendicular to the top plate inner ring wall height 40, the bottom annular lip 54 configured to engage the connecting elastomer 102 and/or spring 96 and act as a stop when the wheel seal 10 is in the raised/extended position or tilted configuration.

The wheel seal 10 may also include a lubricant 116 (e.g., oil) located between the top plate metal core 52 and the connecting elastomer 102.

The wheel seal 10 may also be located in a cardboard box 118 comprising dotted lines comprising a plurality of concentric semi-circles 120A, 120B and 120C. A user may cut along the dotted lines forming at least one of the semi-circles. The cardboard box 118 may also include a tube of seal bond.

In the exemplary embodiment, the wheel seal 10 is located on a wheel (not shown) of a vehicle, such as a truck. The wheel is configured to move along a road and includes a spindle (not shown) and a hub 126 surrounding the spindle. The body inner ring wall 14 may engage the spindle. The wheel seal 10 may also be configured to flex between the spindle and the hub 126 as the wheel moves along the road and as the hub 126 is being installed on to the spindle.

The wheel seal 10 may be installed on the wheel by providing a wheel comprising a spindle and a hub 126 surrounding the wheel seal 10, providing the wheel seal 10, placing the wheel seal 10 in the hub 126 with the body outer ring wall 16 engaging the hub 126, and striking the top wall 32 of the wheel seal 10 with a hammer to install the wheel seal 10 within the wheel hub 126.

| Part List | |
| --- | --- |
| wheel seal | 10 |
| annular wheel seal body | 12 |
| body inner ring wall | 14 |
| body outer ring wall | 16 |
| body top | 18 |
| body bottom | 20 |
| body height | 22 |
| body interior | 24 |
| top plate | 26 |
| top plate outer diameter | 28 |
| top plate inner diameter | 30 |
| top plate top wall | 32 |
| top plate inner ring wall | 34 |
| top plate inner ring wall top | 36 |
| top plate inner ring wall bottom | 38 |
| top plate inner ring wall height | 40 |
| top plate outer ring wall | 42 |
| top plate outer ring wall top | 44 |
| top plate outer ring wall bottom | 46 |
| top plate outer ring wall height | 48 |
| top plate ribs | 50 |
| top plate metal core | 52 |
| top plate core bottom annular lip | 54 |
| top plate core inner vertical annular segment | 56 |
| top plate core horizontal annular segment | 58 |
| top plate core outer vertical annular segment | 60 |
| top plate outer elastomer | 62 |
| rectangular free inner edge | 64 |
| bottom plate | 66 |
| bottom plate outer diameter | 68 |
| bottom plate inner diameter | 70 |
| bottom plate inner ring wall | 72 |
| bottom plate outer ring wall | 74 |
| bottom plate outer ring wall top | 76 |
| bottom plate outer ring wall bottom | 78 |
| bottom plate outer ring wall height | 80 |
| lower portion of the body outer ring wall | 82 |
| bottom plate ribs | 84 |
| bottom plate metal core | 86 |
| bottom plate core top horizontal annular segment | 88 |
| bottom plate core indented vertical annular segment | 90 |
| bottom plate core lower horizontal annular segment | 92 |
| bottom plate core outer vertical annular segment | 94 |
| annular spring | 96 |
| annular spring outer diameter | 98 |
| annular spring inner diameter | 100 |
| connecting elastomer | 102 |
| connecting elastomer surface | 104 |
| projections | 106 |
| rectangular recess | 108 |
| gap | 110 |
| lubricant | 116 |
| cardboard box | 118 |
| concentric semi-circles | 120a-c |
| hub | 126 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about", and "approximately" as used herein mean a reasonable amount of deviation of the modified terms such that the end result is not significantly changed. For example, these terms can be construed as including a deviation of at least ±5% of the modified term if this deviation would not negate the meaning of the word it modifies.

What is claimed is:

1. A wheel seal comprising:

an annular wheel seal body comprising a body inner ring wall, a body outer ring wall, a body top, a body bottom, a body height extending from the body top to the body bottom, and a body interior located between the body inner ring wall and the body outer ring wall, the annular wheel seal body further comprising:

i) a top plate comprising a top wall forming the body top, a top plate inner ring wall forming at least a portion of the body inner ring wall and a top plate outer ring wall forming an upper portion of the body outer ring wall, the top plate outer ring wall comprising a top, a bottom and a height extending from the top to the bottom, the top plate inner ring wall comprising a top, a bottom, a height extending from the top to the bottom, and a plurality of top plate ribs extending circumferentially around the top plate inner ring wall and spaced about the top plate inner ring wall height, the top plate comprised of a top plate metal core lined on a plurality of sides by a top plate outer elastomer, wherein the top plate outer elastomer forms at least a portion of the top plate top wall, the top plate inner ring wall and the top plate outer ring wall;

ii) a bottom plate located below the top plate top wall, the bottom plate comprising a bottom plate outer ring wall located below the top plate outer ring wall and forming a lower portion of the body outer ring wall, the bottom plate outer ring wall comprising a top, a bottom, a height extending from the top to the bottom and generally parallel to the top plate outer wall height, and a plurality of bottom plate ribs extending circumferentially around the bottom plate outer ring wall and spaced about the bottom plate outer wall height, the bottom plate comprised of a bottom plate metal core;

an annular spring located in the body interior; and a connecting elastomer located in the body interior and extending at least partially around the spring, the connecting elastomer comprising at least one projection engaging the top plate metal core, the connecting elastomer extending at least partially around the bottom plate metal core and forming at least a portion of the bottom plate outer ring wall, wherein the top of the bottom plate outer ring wall is separated from the bottom of the top plate outer ring wall by a gap having an adjustable height extending generally parallel to the top plate outer ring wall and the bottom plate outer ring wall, wherein the gap extends circumferentially around the body outer ring wall, wherein the top plate is configured to move vertically relative to the bottom plate between a lowered position and a raised position so as to change the height of the gap and the body height, wherein the top plate is configured to tilt relative to the bottom plate between an untilted configuration in which the gap is the same height about the body outer ring wall circumference and a tilted configuration in which the gap is not the same height along the body outer ring wall circumference, wherein the top plate metal core further comprises a top, and a bottom annular lip extending from the top plate inner ring wall radially outward toward the bottom plate outer ring wall generally perpendicular to the top plate inner ring wall height, the bottom annular lip located directly below the connecting elastomer and configured to engage the connecting elastomer and act as a stop when the wheel seal is in the raised position or tilted configuration, wherein the top plate metal core further comprises an inner vertical annular segment extending upward from the bottom annular lip generally parallel to the top plate inner ring wall height, a horizontal annular segment extending from a top of the inner vertical annular segment generally perpendicular to the top plate inner ring wall height, and an outer vertical annular segment located radially outward as compared to the inner vertical annular segment and extending from a top of the horizontal annular segment downward generally parallel to the top plate outer ring wall height and perpendicular to the horizontal annular segment, wherein the bottom plate outer ring wall is parallel to the top plate outer ring wall and the outer vertical annular segment of the top plate metal core and perpendicular to the horizontal annular segment, wherein the connecting elastomer extends continuously from a first segment partially surrounding the spring, a second segment located between the horizontal annular segment of the top plate metal core and the bottom plate metal core in which the connecting elastomer extends perpendicular to the body height and lines the top of the bottom plate metal core, a third segment in which the connecting elastomer extends downwardly and forms an inner wall extending parallel to the body height, a fourth segment which the connecting elastomer extends perpendicular to the body height and is located below the gap and the top plate metal core, and a fifth segment in which the connecting elastomer extends downwardly and parallel to the body height, forms the bottom plate outer ring wall, and lines the outer vertical annular segment of the bottom plate metal core, wherein the inner wall is located between the outer vertical annular segment of the top plate metal core and the indented vertical annular segment of the bottom plate metal core, wherein the inner wall lines the indented vertical annular segment of the bottom plate metal core, wherein the inner wall faces the gap and the outer vertical annular segment of the top plate metal core, wherein the inner wall comprises a plurality of ribs extending towards the outer vertical annular segment of the top plate metal core, and wherein the top plate outer elastomer comprises an outer segment that forms all of the top plate outer wall and lines the top plate metal core outer vertical annular segment, wherein the bottom plate comprises an outer elastomer forming the bottom plate outer ring wall, wherein the top plate outer wall is substantially aligned with the bottom plate outer ring wall, wherein the top plate comprises atop plate outer diameter, and further wherein the bottom plate comprises a bottom plate outer diameter that is substantially equal in size to the top plate outer diameter.

2. The wheel seal of claim 1 wherein the top plate outer elastomer comprises a top segment that forms all of the top plate top wall and is located directly above the horizontal annular segment of the top plate metal core, and further wherein the top plate outer elastomer extends continuously around and covers the top segment of the top plate metal core.

3. The wheel seal of claim 1 wherein the entire bottom annular lip is straight and extends generally perpendicular to the top plate inner ring wall height from the top plate inner ring wall radially outward to a free end located below the spring.

4. The wheel seal of claim 3 wherein the top plate metal core further comprises an indentation located at an intersection of the bottom annular lip and the inner vertical annular segment.

5. The wheel seal of claim 3 wherein the bottom plate metal core further comprises a generally rectangular free inner edge engaging the connecting elastomer, a top horizontal annular segment extending generally perpendicular to the top plate outer ring wall height and generally parallel to the bottom annular lip and located below the horizontal annular segment of the top plate metal core, an indented vertical annular segment extending downward from the top horizontal annular segment generally parallel to the top plate outer ring wall height, a lower horizontal annular segment located below the top horizontal annular segment and extending from the indented vertical segment toward the bottom plate outer ring wall generally perpendicular to the bottom plate outer ring wall height, and an outer vertical annular segment located below the indented vertical annular segment and extending downward from the lower horizontal annular segment generally parallel to the bottom plate outer ring wall height, and further wherein the outer vertical annular segment of the top plate metal core is parallel to the indented vertical annular segment and outer vertical annular segment of the bottom plate metal core.

6. The wheel seal of claim 1 wherein the top plate metal core outer vertical annular segment comprises a straight inner edge facing the connecting elastomer and extending parallel to the body height.

7. The wheel seal of claim 1 wherein the bottom annular lip comprises a free end located below the spring.

8. The wheel seal of claim 1 wherein substantially all of the top plate metal core and substantially all of the bottom plate metal core are located in the body interior.

9. The wheel seal of claim 1 wherein the bottom plate is not separable from the top plate.

10. The wheel seal of claim 1 wherein the second segment of the connecting elastomer comprises a plurality of projections, the plurality of projections configured to engage the horizontal annular segment when the wheel seal is in the lowered position.

11. The wheel seal of claim 1 wherein the connecting elastomer is comprised of hydrogenated nitrile butadiene rubber (HNBR) and/or nitrile butadiene rubber (NBR).

12. The wheel seal of claim 1 wherein the third segment of the connecting elastomer faces the gap in the raised position and in the lowered position.

13. The wheel seal of claim 1 wherein the connecting elastomer comprises a plurality of projections engaging the inner vertical annular segment.

14. The wheel seal of claim 1 wherein the inner vertical annular segment is straight.

15. The wheel seal of claim 1 wherein the top plate outer elastomer lines substantially all of an inward-facing side of the inner vertical annular segment and forms substantially all of the top plate inner ring wall.

16. A method of using a wheel seal comprising:

a) providing a wheel comprising a spindle and a hub, wherein the wheel seal of claim 1 is located in the hub with the body outer ring wall engaging the hub; and b) driving the wheel along a road, wherein the bottom of the top plate outer ring wall is configured to move vertically relative to the top plate outer ring wall between the lowered position and the raised position so as to change the height of the gap and the body height as the wheel moves along the road.

17. A method of installing a wheel seal on a hub comprising:

a) providing a wheel comprising a spindle and a hub;

b) providing the wheel seal of claim 1;

c) placing the wheel seal in the hub with the body outer ring wall engaging the hub;

d) striking the top wall of the wheel seal with a hammer to install the wheel seal within the hub.

\* \* \* \* \*